United States Patent
Heimberger et al.

(10) Patent No.: US 7,499,375 B2
(45) Date of Patent: Mar. 3, 2009

(54) METHOD FOR DETECTING AN OBSTACLE IN THE DETECTION AREA OF A DETECTION DEVICE

(75) Inventors: Markus Heimberger, Tamm (DE); Heinrich Gotzig, Heilbronn (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 19 days.

(21) Appl. No.: 10/574,642

(22) PCT Filed: Sep. 16, 2004

(86) PCT No.: PCT/EP2004/010359
§ 371 (c)(1), (2), (4) Date: Feb. 9, 2007

(87) PCT Pub. No.: WO2005/036206
PCT Pub. Date: Apr. 21, 2005

(65) Prior Publication Data
US 2007/0274157 A1    Nov. 29, 2007

(30) Foreign Application Priority Data
Oct. 11, 2003    (DE) ................................ 103 47 364

(51) Int. Cl.
*G01S 15/93* (2006.01)
(52) U.S. Cl. ........................... 367/98; 367/909
(58) Field of Classification Search .................. 367/909, 367/99; 340/435
See application file for complete search history.

(56) References Cited

U.S. PATENT DOCUMENTS

| | | | |
|---|---|---|---|
| 5,239,515 A | | 8/1993 | Borenstein |
| 6,765,491 B1 * | | 7/2004 | Nass ........................ 340/686.6 |
| 7,123,545 B2 * | | 10/2006 | Klinnert et al. ................ 367/99 |
| 2007/0274157 A1 * | | 11/2007 | Heimberger et al. .......... 367/95 |
| 2008/0015777 A1 * | | 1/2008 | Hiemberger et al. ........ 701/301 |

FOREIGN PATENT DOCUMENTS

| | | |
|---|---|---|
| DE | 34 41 268 | 11/1996 |
| DE | 196 31 590 | 2/1998 |
| DE | 100 59 673 | 6/2002 |
| EP | 1 031 853 | 8/2000 |
| JP | 59 038675 | 3/1984 |
| JP | 04 250389 | 9/1992 |
| WO | WO 2005036206 A1 * | 4/2005 |

* cited by examiner

*Primary Examiner*—Dan Pihulic
(74) *Attorney, Agent, or Firm*—Paul Vincent

(57) ABSTRACT

A method and a device for monitoring a space for the presence of a foreign body comprises at least one transmitter and a first and second receiving device. The signal of the second receiving device which is spaced further apart from the transmitter than the first receiving device is evaluated for its parasitic signal portions. If the distance between the first and the second receiving device is not too great, it can be assumed that parasitic signal portions detected in the second received signal are also contained in the first received signal. In this case, it is recommended to discontinue monitoring the space or to discard any result of this monitoring already obtained at least until no parasitic signal portions are detected in a repeated evaluation of the second received signal.

14 Claims, 2 Drawing Sheets

METHOD FOR DETECTING AN OBSTACLE IN THE DETECTION AREA OF A DETECTION DEVICE

This application is the national stage of PCT/EP2004/10359 filed on Sep. 16, 2004 and also claims Paris Convention priority of DE 103 47 364.5 filed on Oct. 11, 2003.

BACKGROUND OF THE INVENTION

The invention concerns a method for detecting an obstacle in the detection area of a detecting device. The invention also concerns this detecting device and a computer program for performing the method. The invention also concerns a data carrier having this computer program.

Detecting devices of this type are known in the art. They are typically installed in the bumper of an automotive vehicle and are used as a parking aid by detecting obstacles in the immediate vicinity of the vehicle. Devices of this type are typically operated using ultrasound and comprise at least one transmitter and at least one first and one second receiving device, wherein the second receiving device is spaced further apart from the transmitter than the first receiving device. The transmitter of the detecting device is designed to emit a transmission signal, e.g. an ultrasound signal, at particular transmitting times in order to detect an obstacle in the detection area of the detecting device. At this transmitting time, the first receiving device is activated to receive a first received signal and the second receiving device is activated to receive a second received signal, wherein the received signals may comprise, in particular, portions of the transmission signal, which are reflected from the obstacle. At least the first received signal is subsequently evaluated for the presence of the obstacle in the detection area of the detecting device. The obstacle is recognized when at least the first received signal contains the portions of the transmission signal reflected from the obstacle.

In order to evaluate the at least first received signal for the presence of the obstacle, the first received signal is conventionally not detected directly after the transmitting time but after a threshold time which is individually associated with each receiving device. This threshold time is conventionally typically defined by the distance from the transmitter associated with each receiving device. The threshold time which is characteristic for a receiving device is obtained by dividing the distance between the transmitter and the receiving device by the propagation speed of the transmission signal in space. This means that signal portions of the respective received signal which are received at a time before the threshold time associated with this distance, cannot possibly be derived from the obstacle to be detected. For this reason, the detecting devices are physically not able to detect obstacles being positioned at a shorter distance from the device than the acoustical short circuit which is defined as half the respective distance between the transmitter and receiving device. For the same reason, as mentioned above, the evaluation of the received signal is started only after the individual threshold time.

The received signal may, however, contain at least parts of parasitic signals even after this threshold time, which can produce false information about the presence of an obstacle in the detection area of the detecting device if they are erroneously assumed to be portions of the transmission signal reflected from the obstacle. This error is very likely since the signal shapes of the parasitic signals will not necessarily differ from the reflected portions of the transmission signal.

Departing therefrom, it is the object of the present invention to further develop a conventional method for detecting an obstacle and a computer program and a detecting device for performing this method in such a manner that a reliable statement about the presence of an obstacle in the detection area of the detecting device is obtained.

SUMMARY OF THE INVENTION

This object is achieved by the method claimed in the independent method claim. This method is characterized by the following advantageous steps: Preferably repeated evaluation of at least part of the second received signal in view of parasitic signal portions which indicate the presence of a parasitic signal source in space; and monitoring or evaluating the monitoring result only if no parasitic signal portion has been detected in the second received signal.

The inventive method provides parasitic signal detection which is independent of the detection of an obstacle. When a parasitic signal is detected by the second receiving device which is located at a distance from the first receiving device, the worst possible case is assumed, i.e. that this parasitic signal is also contained in the first received signal and could correspondingly produce a faulty evaluation of the received signal for the presence of the obstacle. In order to prevent such misinterpretation, monitoring of at least the first received signal for the presence of an obstacle or the evaluation of the monitoring result is discontinued for a certain stop period in such cases. In other words and in accordance with the invention, the first received signal is evaluated for the presence of an obstacle only if no parasitic signal portion has been detected. This provides a more reliable statement about the presence of an obstacle in the detection area.

The second received signal is advantageously evaluated for parasitic signal portions contained therein only in a time interval between the transmitting time and a threshold time represented by the spatial distance between the second receiving device and the transmitter, since only in this case, is it guaranteed that the second received signal does not contain any portions of the transmission signal reflected from the obstacle, but inevitably contains only parasitic signal portions.

In order to further increase the reliability of the statement about the presence of the obstacle, the process of transmitting the transmission signal, receiving the first and second received signals and evaluation of the second received signal for parasitic signal portions is repeated at least once.

The above-described object of the invention is also achieved by a computer program and a detecting device for performing this method, and a data carrier comprising the computer program. The advantages of these solutions correspond to the advantages described above with reference to the claimed method. Moreover, the separation between the second receiving device and the transmitter is advantageously as large as possible.

The second receiving device may advantageously be designed to detect other physical signals, in particular, parasitic signals in as far as these signals may have a negative influence on the reception by the first receiving device or on the first received signal.

DESCRIPTION OF THE PREFERRED EMBODIMENT

Figure 1:
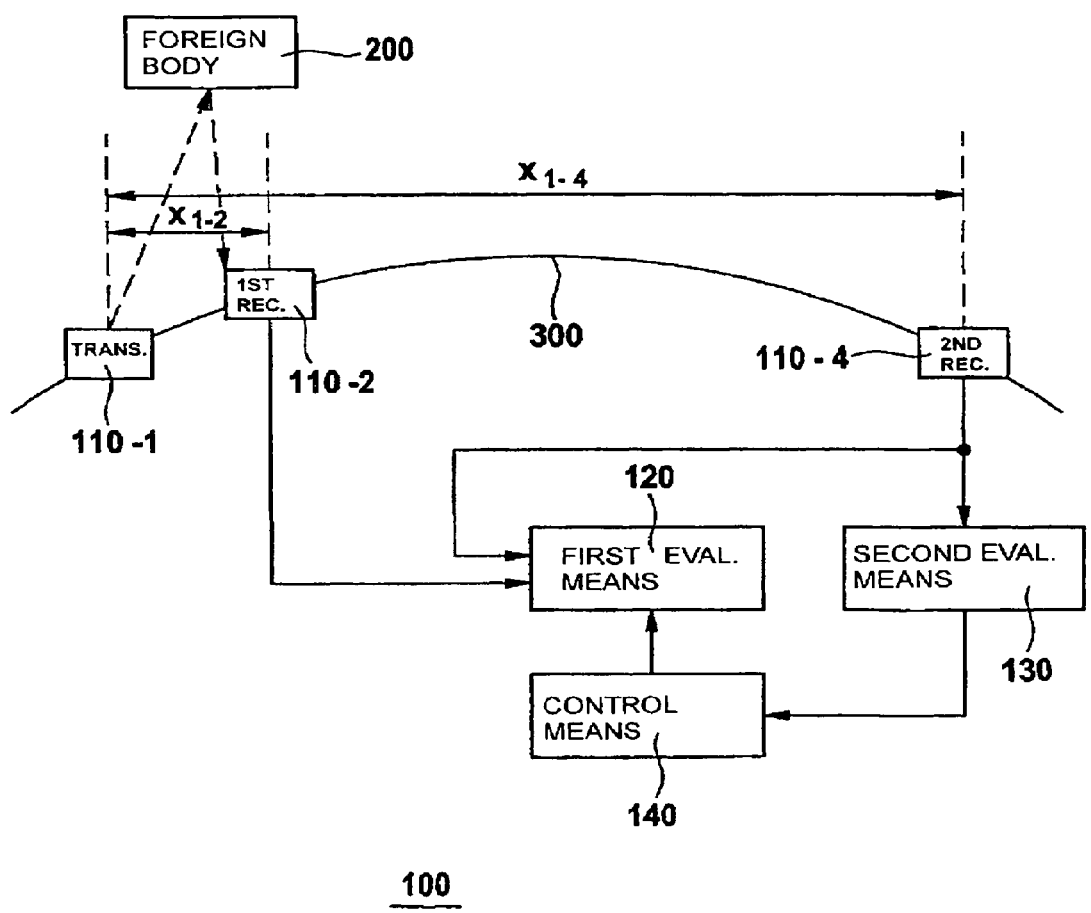
FIG. 1 shows the structure of the inventive detecting device.

The monitoring device 100 shown in FIG. 1 for monitoring a spatial region comprises at least one transmitter 110-1 for transmitting a transmission signal and at least one first receiving device 110-2 for receiving a first received signal, and a second receiving device 110-4 for receiving a second received signal. An important feature of the inventive structure of the monitoring device 100 is that the second receiving device 110-4 is spaced further apart from the transmitter 110-1 than the first receiving device 110-2, since the first receiving device 110-2 is provided for detecting the foreign body 200 while the second receiving device 110-4 is provided for detecting parasitic signal portions. This is described in more detail below.

The monitoring device 100 moreover comprises a first evaluation means 120 for evaluating at least the first received signal for the presence of the foreign body 200 in space. The second receiving device 110-4 may optionally also be used for detecting the foreign body 200 in addition to the first receiving device 110-2. For physical reasons, however, it is advantageous for this detection to only use those receiving devices having a minimum separation from the transmitter 110-1.

In accordance with the invention, the monitoring device 100 also comprises a second evaluation means 130 for evaluating the second received signal for parasitic signal portions which indicate the presence of a parasitic signal source (not shown) in space. The monitoring device 100 finally comprises a control means 140 for activating at least the first evaluation means or for releasing the monitoring result with regard to the presence of a foreign body only when the second evaluating means 130 has detected no parasitic signal in the second received signal.

A typical source of disturbances that could generate the undesired parasitic signals is e.g. the braking system of a truck during ventilation thereof, which generates large air pressure fluctuations in the vicinity of the truck which, as a disturbing signal, could have a negative influence on the monitoring of the vicinity of a near-by vehicle having a monitoring device installed therein, in particular, when this monitoring device is operated with ultrasound.

Each monitoring means is basically operated according to a physical principle, in particular, on the basis of ultrasound. Disturbance by parasitic signals having the same physical properties is therefore likely. For this reason, it is generally advantageous to design the receiving device to detect physically similar signals as parasitic signals. The monitoring device may, however, also be disturbed by physically different parasitic signals. It is thereby e.g. possible that a monitoring device 100 with transmitting and first receiving devices operating on an ultrasound basis is also disturbed by radar signals. In order to efficiently detect such parasitic signals, the second receiving device 110-4 is advantageously designed to detect such different physical signals.

The transmitter and receiving devices 110-1 . . . -4 (FIG. 1) may each be part of a transformer means. A transformer means, e.g. an ultrasound transformer, is characterized in that it can be optionally operated either as transmitter or as receiving device. With reference to FIG. 1, this would mean that each of the devices 110--1 . . . -4 shown therein can be operated optionally as transmitter or receiving device. For detecting the foreign body 200 and for detecting possible parasitic signal portions, the position of the transmitter and receiving devices is advantageously preferably changed for each repeated performance of the method for detecting the foreign body and/or for detecting the parasitic signal portion. The change is preferably cyclic. If the method is initially performed with the above-described arrangement of transmitter 110-1 and receiving devices 110-2 . . . -4, it would be possible to operate a transformer means at the position 110-4 as transmitter in a subsequent cyclic repetition of the method, while the other transformer means at the positions of the means 110-1, 110-2 are each operated as receiving devices. It would then be recommendable to operate the transformer means at position 110-1 as second receiving device for detecting the parasitic signal portion, since this transformer means has the largest distance from the transformer means at position 110-4 which is operated as a transmitter.

One precondition would be a connection between the transformer means at position 110-1 and the second evaluation means 130 (not shown in FIG. 1). Moreover, the transformer means would have to be adjusted by a control means, e.g. the control means 140, to the respectively desired mode of operation, i.e. transmitting or receiving mode.

The function of the monitoring device described in FIG. 1, i.e. the inventive method for monitoring a space is described in more detail below with reference to FIGS. 1 and 2.

Figure 2:
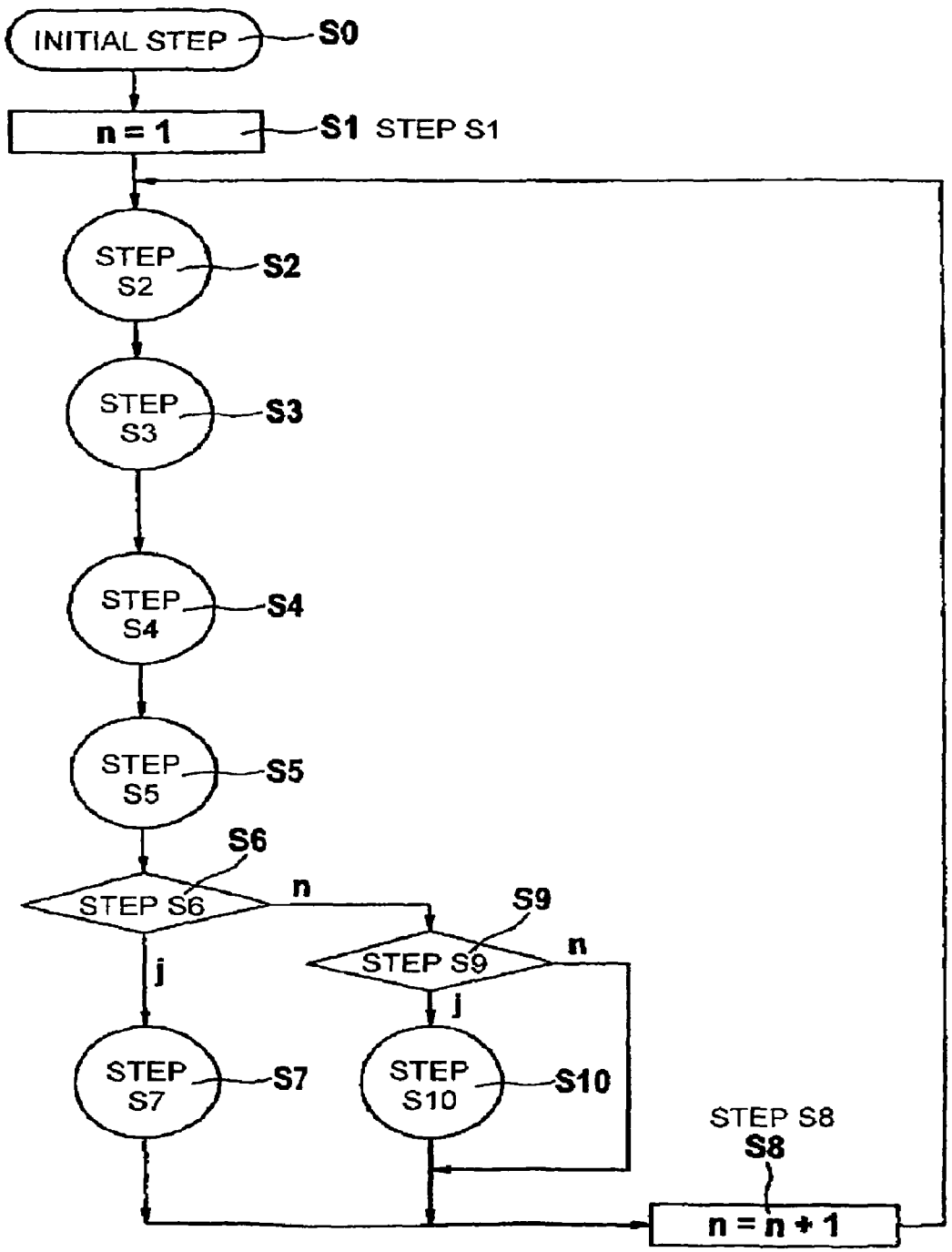
FIG. 2 shows the inventive method.

FIG. 2 shows that after an initial step S0, different variables are at first initiated in step S1. This involves designation of a variable n preferably with 1, which represents the number of the respectively performed runs of the method. In step S1 it is then determined whether the parasitic signal detection (to be described in more detail below) shall start before, at the same time, or only after start of monitoring of the space for the presence of a foreign body. In the embodiment of FIG. 2, it is exemplarily assumed that monitoring of the space (steps S2-S4) already starts with the beginning of monitoring for parasitic signals (step S5). This situation is further explained in the following description.

After initialization in step S1, the monitoring of the space, in particular, of the surroundings of a vehicle for the presence of a foreign body 200, in particular, of a parking obstacle, is started in step S2 by transmitting a transmission signal via the transmitter 110-1 into the space at a particular transmitting time. Preferably at the same time, the first receiving device 110-2 for receiving a first received signal is activated in step S3. Then the first signal received from the receiving device 110-2 is evaluated by the first evaluation means 120 in step S4 with regard to the presence of a foreign body 200 in the space. The evaluation means 120 detects the foreign body 200 by detecting portions of the transmission signal in the first received signal which were previously transmitted by the transmitter 110-1 and reflected from the foreign body 200.

The question or determination of whether the signal portions detected in the first transmission signal are actually signal portions reflected from the foreign body 200 or whether these signal portions are possibly derived from a parasitic signal source (not shown) located in the space, cannot in general be determined from the signal shape of the signal portions in the first received signal. For this reason, additional information is helpful which permits a decision as to whether or not the first received signal at least partially contains parasitic signals.

A first indication thereof is the time period elapsed between the transmission of the transmission signal and the time of receipt of the first received signal. If this time period is shorter than a first threshold time represented by the travelling time of the transmission signal between the first receiving device and the transmitter, one can be sure that the detected first received signal does not contain portions of the transmission signal reflected from the foreign body 200. This is due to the basic physical principle that the transmission signal transmitted by the transmitter 110-1 requires a minimum amount of time, represented by the above-mentioned threshold value, to reach the respective receiving device 110-2. This minimum time depends on the direct separation between the transmitter 110 and the receiving device 110-2 and on the propagation speed of the transmission signal in space, i.e. for example the speed of sound. Due to this basic physical principle, the part of the first received signal received before lapse of the above-mentioned threshold time is conventionally also not evaluated for determining the presence of a foreign body 200.

However, even after this first threshold time, it is still possible that parts of parasitic signal portions are contained in the first received signal, which considerably decreases the reliability of a conclusion about the presence of the foreign body in space. For this reason, it is desirable to know whether or not the first received signal contains or at least could contain parasitic signal portions, even after this first threshold time.

In order to solve this problem, in accordance with the invention, the received signal of the second receiving device 110-4 is evaluated in view of the presence of parasitic signal portions in step S5. In order to ensure that the second receiving device 110-4 actually detects only possible parasitic signal portions, the second received signal is evaluated only at a time interval between the transmitting time, at which the transmission signal is transmitted, and a second threshold time individually associated with the second receiving device. The second threshold time for the second receiving device is defined in an analog manner to the first threshold time associated with the first receiving device 110-2. It is, however, at a later time after the transmitting time than the threshold time associated with the first receiving device 110-2, since the separation between the second receiving device 110-4 and the transmitter 110-1 is larger than the spatial separation between the first receiving device 110-2 and the transmitter 110-1. The difference between the two threshold times represents the time during which a statement can be made about the presence of possible parasitic signals in the first receiving signal after the first threshold time. The larger this time interval, the longer is the possible time for predictions. In order to realize a maximum time difference, the separation between the second receiving device 110-4 and the transmitter 110-1 is advantageously maximum compared to the separation between the first receiving device 110-2 and the transmitter 110-1. In practice, in particular, when the monitoring means is installed in a bumper 300, this ratio is generally automatically limited by the given dimensions of the bumper or the vehicle. Although this separation should be as large as possible, it must not be excessively large in order to avoid that, upon detection of a parasitic signal portion in the second received signal at such an excessive separation between the second and first receiving device, the assumption on which the invention is based, i.e. that the parasitic signal portions detected in the second received signal are also contained in the first received signal is probably no longer true.

If step S6 determines that parasitic signal portions were detected in the second received signal in the evaluation of step S5, the result of the evaluation of the first received signal performed in step S4 for the presence of the foreign body 200 is discarded in step S7, since this result is most likely falsified by the parasitic signal portions determined in steps S5 and S6. On the other hand, if no parasitic signal has been detected in the second received signal in step S6, since it is classified as authentic or correct due to non-existing parasitic signal portions, the first received signal is released for evaluation S10. The release in step 510 may be linked with an additional condition as indicated in step S9 in FIG. 2. This additional condition may e.g. be the precondition that a predetermined stop time must have elapsed after the last detection of a parasitic signal portion in the second received signal before release in step S10. Release of the result of the evaluation by the first evaluation means 120 in step S10 or its blockage for further use is indicated in FIG. 1 by a connection between the control means 140 and the first evaluation means 120 via which a corresponding release signal is transmitted to the first evaluation means.

Alternatively, via step S9, a predetermined number of repeated evaluations of the second received signal must be performed after the last detection of parasitic signal portions without detecting any further parasitic signal portions in the second received signal, before release according to step S10 is allowed. If the respective condition is not met, step S10 of FIG. 2 is skipped. After step S7 or after step S10, the variable n, which represents the number of runs of the inventive method, is incremented by one in step S8. The method advantageously branches back to the start of step S2 to continue monitoring the space for the presence of a foreign body 200 by re-transmitting the transmission signal. As mentioned above with reference to FIG. 1, it may be advantageous in this repetition to activate a transmitter, which is positioned at another location than the transmitter 110-1 activated in the previous run. In the subsequent new run, a stop time which could be selected as a condition in step S9, is advantageously fully reset when, upon repetition of the steps S5 and S6, it was determined again or confirmed that there are still parasitic signal portions in the second received signal.

The above-described inventive method is preferably realized in the form of a computer program for the monitoring device. This computer program may optionally be stored together with further computer programs for the monitoring device on a data carrier. The data carrier may be a disc, a compact disc, a flash memory or the like. The computer program stored on the data carrier may then be sold as a product to a customer.

Alternatively, the computer program may also be transferred and sold as product to a customer without an electronic storage medium, via an electronic communications network, in particular, the Internet.

We claim:

1. A method for monitoring a space or a vicinity of an automotive vehicle for a presence of a foreign body or an obstacle using a monitoring device, the monitoring device having at least one transmitter and at least one first and one second receiving device, wherein the second receiving device is spaced further apart from the transmitter than the first receiving device, the method comprising the steps of:
   a) receiving at least one second received signal from the second receiving device;
   b) evaluating at least one part of the second received signal for parasitic signal portions which indicate a presence of a parasitic signal source in the space; and
   c) monitoring or evaluating a monitoring result only when no parasitic signal portion has been detected in step b), wherein the part of the second signal evaluated for detection of the parasitic signal portions is received before a threshold time represented by a spatial distance between the second receiving device and the transmitter.

2. The method of claim 1, wherein the space is monitored or a monitoring result is evaluated only after lapse of a predetermined stop time after a last detection of parasitic signal portions in a previous instantaneous second received signal.

3. The method of claim 2, wherein the stop time is fully reset for each repeated detection of parasitic signal portions.

4. The method of claim 1, wherein the space is monitored or a monitoring result is evaluated only when no parasitic portions have been detected in a predetermined number of repeated evaluations of the second received signal.

5. The method of claim 1, wherein detection of the foreign body further comprises the steps of:
   transmitting a transmission signal via the transmitter into the space at a transmitting time;
   receiving a first received signal of the first receiving device and the second received signal of the second receiving device; and
   evaluating at least the first received signal for a presence of the foreign body in the space.

6. The method of claim 5, wherein the foreign body is represented by portions of the transmission signal reflected from the foreign body in at least one of the first and the second received signals.

7. The method of claim 5, wherein the monitoring device comprises several transmitters each with at least one first and one second associated receiving device, individual transmitters and their associated receiving devices being preferably alternately activated in cycles for individual repetitions of detection of the foreign body or evaluation of the second received signal.

8. A computer program including program code for a monitoring device to perform the method of claim 1.

9. A data carrier comprising the computer program of claim 8.

10. A device for monitoring a space or a vicinity of an automotive vehicle for a presence of a foreign body or an obstacle using a monitoring device, the monitoring device having at least one transmitter and at least one first and one second receiving device, wherein the second receiving device is spaced further apart from the transmitter than the first receiving device, the device comprising:
   means for receiving at least one second received signal from the second receiving device;
   means for evaluating at least one part of the second received signal for parasitic signal portions which indicate a presence of a parasitic signal source in the space; and
   means for monitoring or evaluating a monitoring result only when no parasitic signal portion has been detected in the second received signal, wherein the part of the second signal evaluated for detection of the parasitic signal portions is received before a threshold time represented by a spatial distance between the second receiving device and the transmitter.

11. The device of claim 10, wherein a first evaluation means evaluates a first received signal of said first receiving device for a presence of a foreign body in the space and a second evaluation means evaluates at least a portion of the second received signal for parasitic signal portions which indicate a presence of a parasitic signal portion in the space, wherein a control means activates the at least first evaluation means or releases a monitoring result concerning the presence of a foreign body only when the second evaluation means has detected no parasitic signals in the second received signal.

12. The monitoring device of claim 11, wherein the second receiving device is designed to receive signals which are physically similar to or physically different from those of the first receiving device.

13. The monitoring device of claim 11, wherein the transmitter and/or receiving devices are at least partially formed as part of a transformer means.

14. The monitoring device of claim 13, wherein the transformer means is operated as a transmitter or receiving device.

* * * * *